United States Patent
Tarafdar et al.

(10) Patent No.: US 8,459,356 B2
(45) Date of Patent: Jun. 11, 2013

(54) CEMENT COMPOSITION CONTAINING A SUBSTITUTED ETHOXYLATED PHENOL SURFACTANT FOR USE IN AN OIL-CONTAMINATED WELL

(71) Applicant: Halliburton Energy Services, Inc., Houston, TX (US)

(72) Inventors: Abhijit Tarafdar, Pune (IN); Trissa Joseph, Pune (IN); Vineet Vasant Sathe, Dombivali (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/713,890

(22) Filed: Dec. 13, 2012

(65) Prior Publication Data

US 2013/0098273 A1    Apr. 25, 2013

Related U.S. Application Data

(62) Division of application No. 12/844,577, filed on Jul. 27, 2010, now Pat. No. 8,360,150.

(51) Int. Cl.
*E21B 33/13* (2006.01)
*C04B 24/00* (2006.01)
*C04B 40/00* (2006.01)

(52) U.S. Cl.
USPC ........ 166/294; 166/305.1; 106/696; 106/724; 106/823

(58) Field of Classification Search
None
See application file for complete search history.

(56) References Cited

U.S. PATENT DOCUMENTS

| | | |
|---|---|---|
| 5,016,711 A | 5/1991 | Cowan |
| 5,207,831 A | 5/1993 | Cowan |
| 5,275,654 A | 1/1994 | Cowan |
| 5,298,070 A | 3/1994 | Cowan |
| 5,460,750 A | 10/1995 | Diaz-Arauzo |
| 5,866,517 A | 2/1999 | Carpenter et al. |
| 6,283,213 B1 | 9/2001 | Chan |
| 2002/0100394 A1 | 8/2002 | Lu |
| 2005/0022445 A1 | 2/2005 | Sarin et al. |

FOREIGN PATENT DOCUMENTS

| | | |
|---|---|---|
| EP | 0315243 A1 | 4/1989 |
| EP | 1362087 B1 | 9/2005 |
| EP | 2008224011 | 3/2010 |
| WO | 9221741 A1 | 12/1992 |
| WO | 9419574 A1 | 9/1994 |

*Primary Examiner* — Angela M DiTrani
(74) *Attorney, Agent, or Firm* — Craig W. Roddy; Sheri Higgins Law

(57) ABSTRACT

A well treatment composition comprises a surfactant comprising a substituted ethoxylated phenol having at least one substituent, 1 to 14 moles of ethylene oxide, and the substituent being an alkyl, alkene, or alkyne with a carbon chain length in the range of 4 to 25, wherein the substituted ethoxylated phenol is selected from the group consisting of: ortho-, para-, or meta-substituted ethoxylated phenol; cardanol ethoxylate; derivatives thereof; and combinations of any of the foregoing. Preferably, the surfactant comprises cardanol ethoxylate, a substituted cardanol ethoxylate, and derivatives thereof. A method of cementing in a subterranean formation comprises: introducing a cement composition into the subterranean formation, wherein the cement composition comprises: (A) cement; (B) water; and (C) the surfactant; and allowing the cement composition to set.

19 Claims, No Drawings

CEMENT COMPOSITION CONTAINING A SUBSTITUTED ETHOXYLATED PHENOL SURFACTANT FOR USE IN AN OIL-CONTAMINATED WELL

CROSS-REFERENCE TO RELATED APPLICATIONS

This application is a divisional of prior U.S. application Ser. No. 12/844,577, filed Jul. 27, 2010.

TECHNICAL FIELD

A well treatment composition containing a surfactant of a substituted ethoxylated phenol is provided. A method of cementing in a subterranean formation using the surfactant is also provided. In an embodiment, the subterranean formation is penetrated by a well.

SUMMARY

According to an embodiment, a well treatment composition comprises a surfactant comprising a substituted ethoxylated phenol and derivatives thereof, having at least one substituent, wherein the substituted ethoxylated phenol and derivatives thereof comprises at least one of the following chemical structures:

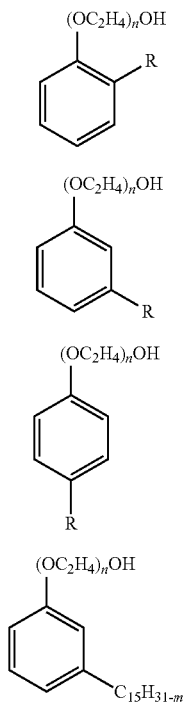

where n=1-14, R=an alkyl, alkene, or alkyne with a carbon chain length in the range of 4 to 25, and where m=0, 2, 4, and 6. According to another embodiment, the substituted ethoxylated phenol and derivatives thereof, according to the chemical structure identified as IV above, is a substituted cardanol ethoxylate and wherein the substituted cardanol ethoxylate and derivatives thereof has at least one of the following chemical structures:

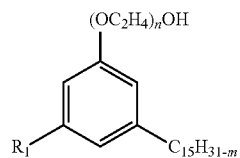

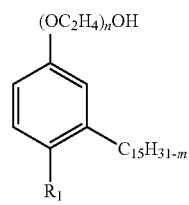

where n=1-14; m=0, 2, 4, and 6; and R1=an alkyl, alkene, or alkyne with a carbon chain length in the range of 4 to 25.

According to another embodiment, a method of cementing in a subterranean formation comprises: introducing a cement composition into the subterranean formation comprising: (A) cement; (B) water; and (C) the surfactant; and allowing the cement composition to set.

DETAILED DESCRIPTION

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase.

As used herein, the term "water based" means a homogenous fluid comprising water or a colloid in which the continuous phase comprises water. As used herein, the term "oil based" means a homogenous fluid comprising a hydrocarbon liquid or a colloid in which the continuous phase comprises a hydrocarbon liquid. The hydrocarbon liquid can be naturally-occurring or a synthetic liquid.

As used herein, a "cement composition" is a mixture of at least cement and water, and possibly additives. As used herein, the term "cement" means an initially dry substance that, in the presence of water, acts as a binder to bind other materials together. An example of cement is Portland cement. A cement composition is generally a slurry in which the water is the continuous phase of the slurry and the cement (and any other insoluble particles) is the dispersed phase. The continuous phase can include dissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through the subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

Generally, drilling fluids are either water based or oil based. An oil-based drilling fluid can include a synthetic hydrocarbon liquid. Examples of hydrocarbon liquids used in oil-based drilling fluids include, but are not limited to: a fractional distillate of crude oil; a fatty derivative of an acid, an ester, an ether, an alcohol, an amine, an amide, or an imide; a saturated hydrocarbon (such as an alkane or parrafin); an unsaturated hydrocarbon (such as an internal olefin); a branched hydrocarbon; and a cyclic hydrocarbon. Commercially-available examples of hydrocarbon liquids include, but are not limited to: ENCORE® drilling fluid, BAROID ALKANE™ base fluid, XP-07™ base fluid, and PETROFREE® ESTER base fluid, marketed by Halliburton Energy Services, Inc.; and ESCAID 110™ available from ExxonMobil in Houston, Tex., USA.

Oil-based drilling fluids can provide better shale inhibition, better lubrication, higher rates of penetration, and deeper bit penetration compared to a water-based drilling fluid. Therefore, it is often desirable to use an oil-based drilling fluid as opposed to a water-based drilling fluid.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or gravel packing operations.

It is desirable to remove a drilling fluid completely from a wellbore before a cement composition is introduced into the wellbore. A spacer fluid can be introduced into the wellbore after the drilling fluid and before the cement composition. The spacer fluid can be circulated down through a drill string or tubing string and up through an annulus. The spacer fluid functions to remove the drilling fluid from the wellbore.

Oil-based drilling fluids are generally more difficult to remove with a spacer fluid compared to water-based drilling fluids. As a result, it is common for some of an oil-based drilling fluid to remain in the well even after introducing a spacer fluid into the well. The remaining oil-based drilling fluid is commonly referred to as a "mud-pocket". A cement composition can mix with some of the remaining oil-based drilling fluid and become "contaminated." If some of the remaining oil-based drilling fluid mixes with the cement composition, then the drilling fluid can cause adverse effects on some of the properties of the cement composition. For example, the rheology and compressive strength of the cement composition can be adversely affected.

It has been discovered that a cement composition containing a surfactant of a substituted ethoxylated phenol and derivatives thereof can be used in a subterranean formation containing an oil-based drilling fluid. In one embodiment, the substituted ethoxylated phenol is a cardanol ethoxylate. The oil-based drilling fluid contaminated cement composition containing the surfactant may exhibit better rheology and a higher compressive strength compared to a contaminated cement composition without the surfactant. Another advantage of the surfactant is that it is compatible with a variety of cement additives. For example, the surfactant is compatible with Channel Seal™ Fluid, marketed by Halliburton Energy Services, Inc. The surfactant can form a stable emulsion with Channel Seal™ Oil-based Fluid at a temperature of 130° F. (54° C.) for up to 7 days.

A surfactant can increase the water solubility of some hydrophobic compounds that are poorly soluble in water. A surfactant is amphiphilic, comprising a hydrophobic tail group and a hydrophilic head group. The hydrophilic head can be charged. A cationic surfactant includes a positively-charged head. An anionic surfactant includes a negatively-charged head. A zwitterionic surfactant includes both a positively- and negatively-charged head. A surfactant with no charge is called a non-ionic surfactant.

If a surfactant is in a sufficient concentration in a solution, then the surfactant molecules can form micelles. A "micelle" is an aggregate of surfactant molecules dispersed in a solution. A surfactant in an oil solution can form reverse-micelles with the hydrophobic tails in contact with the hydrocarbon solvent, sequestering the hydrophilic heads in the center of the reverse-micelle. Conversely, a surfactant in an aqueous solution can form micelles with the hydrophilic heads in contact with the surrounding aqueous solvent, sequestering the hydrophobic tails in the micelle center. The surfactant must be in a sufficient concentration to form a reverse-micelle or micelle, known as the critical micelle concentration. The critical micelle concentration is the concentration of surfactant above which reverse-micelles or micelles are spontaneously formed.

When an oil-based drilling fluid is used, it is believed that if the surfactant, according to the embodiments, is included in a cement composition, then the surfactant can sequester some of the hydrocarbon liquid from the oil-based drilling fluid and help prevent the hydrocarbon liquid from contaminating the cement composition. As a result, some of the adverse effects the hydrocarbon liquid can have on the cement composition may be diminished.

During cementing operations, it is desirable for the cement composition to remain pumpable during introduction into the subterranean formation and until the cement composition is situated in the portion of the subterranean formation to be cemented. After the cement composition has reached the portion of the subterranean formation to be cemented, the cement composition can ultimately set. A cement composition that thickens too quickly while being pumped can damage pumping equipment or block tubing or pipes. A cement composition that sets too slowly can cost time and money while waiting for the composition to set.

If any test (e.g., thickening time or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

It is also to be understood that if any test (e.g., thickening time or compressive strength) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). After the cement composition is ramped up to the specified temperature and possibly pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 275 or a Chandler Model 8240. Consistency measurements are taken continuously until the cement composition exceeds 70 Bc.

Rheology is a unit-less measure of how a material deforms and flows. Rheology includes the material's elasticity, plasticity, and viscosity. As used herein, the "rheology" of a cement composition is measured as follows. The cement composition is mixed. The cement composition is placed into the test cell of a rotational viscometer, such as a FANN® Model 35 viscometer, fitted with a Bob and Sleeve attachment and a spring number 1. The cement composition is tested at the specified temperature and ambient pressure, about 1 atm (0.1 MPa). Rheology readings are taken at multiple rpm's, for example, at 3, 6, 30, 60, 100, 200, and 300.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method.

The destructive method mechanically tests the compressive strength of a cement composition. As used herein, the "destructive compressive strength" of a cement composition is measured at ambient temperature (about 71° F., about 22° C.) as follows. The cement composition is mixed. The cement composition is then placed into a test cell for at least 48 hours and a temperature of 220° F. (104° C.) until the cement composition has set. The test cell, containing the set cement composition is then placed into a compression-testing device, such as a Super L Universal testing machine model 602, available from Tinius Olsen, Horsham in Pennsylvania, USA. The pressure is gradually increased until the cement composition breaks. The destructive compressive strength is calculated as the force required to break the sample divided by the smallest cross-sectional area in contact with the load-bearing plates of the compression-testing device. The destructive compressive strength is reported in units of pressure, such as pound-force per square inch (psi) or megapascals (MPa).

The non-destructive method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "non-destructive compressive strength" of a cement composition is measured at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a specified temperature and pressure. As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

As used herein, the "mud contamination" of a cement composition is performed as follows. An oil-based drilling mud is prepared using a specified hydrocarbon liquid as the continuous phase of the drilling mud. The cement composition is mixed. A specified percentage by volume of the drilling mud is hand-mixed with the cement composition using a spatula.

According to an embodiment, a well treatment composition comprises a surfactant comprising a substituted ethoxylated phenol and derivatives thereof, having at least one substituent, wherein the substituted ethoxylated phenol and derivatives thereof comprises at least one of the following chemical structures:

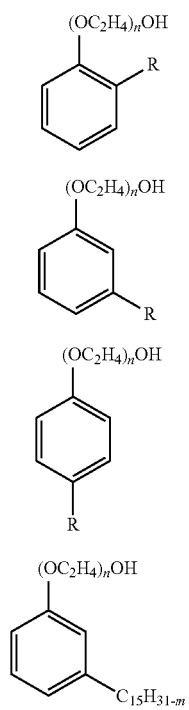

where n=1-14, R=an alkyl, alkene, or alkyne with a carbon chain length in the range of 4 to 25, and where m=0, 2, 4, and 6.

According to another embodiment, a cement composition comprises: (A) cement; (B) water; and (C) the surfactant of the well treatment composition.

The discussion of preferred embodiments regarding the well treatment composition, the cement composition, or any ingredient in the well treatment and cement composition, is intended to apply to the composition embodiments and the method embodiments. Any reference to the unit "gallons" means U.S. gallons. As used herein, the term "soluble" means that at least 1 part of the substance dissolves in 99 parts of the liquid at a temperature of 77° F. (25° C.) and a pressure of 1 atm (0.1 MPa). As used herein, the term "insoluble" means that less than 1 part of the substance dissolves in 99 parts of the liquid at a temperature of 77° F. (25° C.) and a pressure of 1 atm (0.1 MPa).

The cement composition includes cement. The cement can be Class A cement, Class C cement, Class G cement, Class H cement, and any combination thereof. Preferably, the cement is Class G cement or Class H cement.

The cement composition includes water. The water can be selected from the group consisting of freshwater, brackish water, saltwater, and any combination thereof. The cement composition can further include a water-soluble salt. Preferably, the salt is selected from sodium chloride, calcium chloride, calcium bromide, potassium chloride, potassium bromide, magnesium chloride, and any combination thereof. The cement composition can contain the water-soluble salt in a concentration in the range of about 5% to about 35% by weight of the water (ww).

The well treatment and cement compositions include a surfactant. According to an embodiment, the surfactant is non-ionic. The surfactant comprises a substituted ethoxylated phenol and derivatives thereof having at least one of the chemical structures identified as numbers I through IV above. The substituted ethoxylated phenol and derivatives thereof can also include combinations of the chemical structures identified as numbers I through IV above. The substituted ethoxylated phenol has at least one substituent. The substituent can be ortho-substituted (I), meta-substituted (II), or para-substituted (III). The substituted ethoxylated phenol can include 1 to 14 moles of ethylene oxide (n=1-14). Preferably, the substituted ethoxylated phenol includes 6 to 13 moles of ethylene oxide (n=6-13). According to an embodiment, the surfactant comprises a para-substituted ethoxylated phenol derivative (III) in which R=an alkyl with a carbon chain length of 9 (nonyl phenol ethoxylated derivative). The ethoxylated phenol can also include two or more substituents.

Most preferably, the substituted ethoxylated phenol and derivatives thereof is cardanol ethoxylate (identified as chemical structure number IV above). Cardanol is naturally-occurring and is a substituted phenol obtained from cashew nutshell liquid (CSNL), a byproduct of cashew nut processing. CSNL consists primarily of anacardic acid. Anacardic acid becomes decarboxylated when heated in the presence of an acid, yielding the meta-substituted phenol, cardanol. Cardanol can be ethoxylated to produce cardanol ethoxylate. Because cardanol ethoxylate is biodegradable, it can be used in wells where biodegradability is desired. According to an embodiment, the substituted ethoxylated phenol is a substituted cardanol ethoxylate. According to this embodiment, the substituted cardanol ethoxylate is selected from the group consisting of: 6-substituted cardanol ethoxylate (IVa below); 4-substituted cardanol ethoxylate (IVb below); 5-substituted cardanol ethoxylate (IVc below); derivatives of any of the foregoing; and combinations of any of the foregoing.

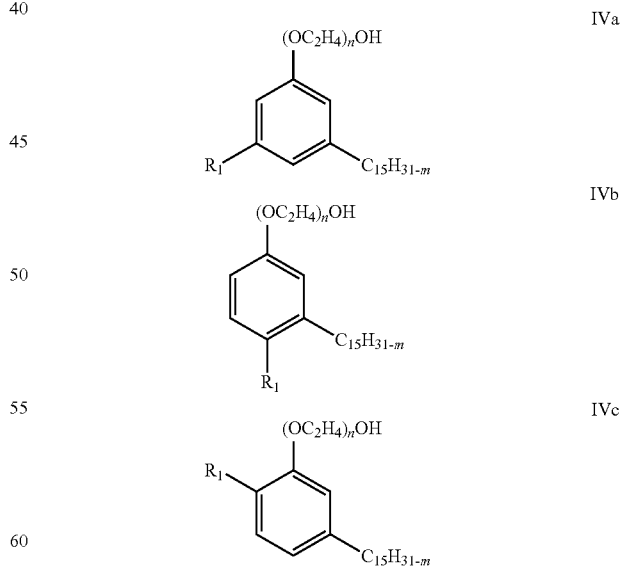

where n=1-14; m=0, 2, 4, and 6; and $R_1$=an alkyl, alkene, or alkyne with a carbon chain length in the range of 4 to 25.

The substituted ethoxylated phenol can be a derivative of a substituted ethoxylated phenol. An example of a derivative of a substituted ethoxylated phenol is cardanol ethoxylate sulphonate (where $R_1$=a sulphonate according to the chemical structures identified as IVa-IVc above).

In one embodiment, the surfactant is in a concentration of at least 0.05% by weight of the cement (bwc). In another embodiment, the surfactant is in a concentration in the range of about 0.05% to about 5% bwc. In another embodiment, the surfactant is in a concentration in the range of about 1% to about 3% bwc.

In an embodiment, the cement composition has a thickening time of at least 3 hours at a temperature of 185° F. (88° C.) and a pressure of 17,500 psi (121 MPa). In another embodiment, the cement composition has a thickening time in the range of about 4 to about 15 hours at a temperature of 185° F. (88° C.) and a pressure of 17,500 psi (121 MPa). Some of the variables that can affect the thickening time of the cement composition include the concentration of any set retarder included in the cement composition, the concentration of any salt present in the cement composition, and the bottomhole temperature of the subterranean formation. As used herein, the term "bottomhole" refers to the portion of the subterranean formation to be cemented. In another embodiment, the cement composition has a thickening time of at least 3 hours at the bottomhole temperature and pressure of the subterranean formation.

In one embodiment, the cement composition has an initial setting time of less than 24 hours at a temperature of 220° F. (104° C.) and a pressure of 3,000 psi (21 MPa). In another embodiment, the cement composition has an initial setting time of less than 24 hours at the bottomhole temperature and pressure of the subterranean formation.

Preferably, the cement composition has a setting time of less than 48 hours at a temperature of 220° F. (104° C.). More preferably, the cement composition has a setting time of less than 24 hours at a temperature of 220° F. (104° C.). Most preferably, the cement composition has a setting time in the range of about 3 to about 24 hours at a temperature of 220° F. (104° C.). In another embodiment, the cement composition has a setting time of less than 48 hours at the bottomhole temperature and pressure of the subterranean formation.

Preferably, the cement composition has a non-destructive compressive strength of at least 500 psi (3.5 MPa) when tested at 24 hours, a temperature of 220° F. (104° C.), and a pressure of 3,000 psi (21 MPa). More preferably, the cement composition has a non-destructive compressive strength in the range of about 500 to about 10,000 psi (about 3.5 to about 69 MPa) when tested at 24 hours, a temperature of 220° F. (104° C.), and a pressure of 3,000 psi (21 MPa).

The cement composition can further include an additive. Examples of an additive include, but are not limited to, a filler, a fluid loss additive, a set retarder, a friction reducer, a strength-retrogression additive, a defoaming agent, a high-density additive, a set accelerator, a mechanical property enhancing additive, a lost-circulation material, a filtration-control additive, a thixotropic additive, a nano-particle, and combinations thereof.

The cement composition can include a filler. Suitable examples of fillers include, but are not limited to, fly ash, sand, clays, and vitrified shale. Preferably, the filler is in a concentration in the range of about 5% to about 50% by weight of the cement (bwc).

The cement composition can include a fluid loss additive. Suitable examples of commercially-available fluid loss additives include, but are not limited to, HALAD®-344, HALAD®-413, and HALAD®-300, marketed by Halliburton Energy Services, Inc. Preferably, the fluid loss additive is in a concentration in the range of about 0.05% to about 10% bwc.

The cement composition can include a set retarder. Suitable examples of commercially-available set retarders include, but are not limited to, HR®-4, HR®-5, HR®-6, HR®-12, HR®-20, HR®-25, SCR-100™, and SCR-500™, marketed by Halliburton Energy Services, Inc. Preferably, the set retarder is in a concentration in the range of about 0.05% to about 10% bwc.

The cement composition can include a friction reducer. Suitable examples of commercially-available friction reducers include, but are not limited to, CFR-2™, CFR-3™, CFR-5LE™, CFR-6™, and CFR-8™, marketed by Halliburton Energy Services, Inc. Preferably, the friction reducer is in a concentration in the range of about 0.1% to about 10% bwc.

The cement composition can include a strength-retrogression additive. Suitable examples of commercially-available strength-retrogression additives include, but are not limited to, SSA-1™ and SSA-2™, marketed by Halliburton Energy Services, Inc. Preferably, the strength-retrogression additive is in a concentration in the range of about 5% to about 50% bwc.

Commercially-available examples of other additives include, but are not limited to, High Dense® No. 3, High Dense® No. 4, Barite™, Micromax™, Silicalite™, WellLife® 665, WellLife® 809, WellLife® 810, and Channel Seal™ Fluid, marketed by Halliburton Energy Services, Inc.

In one embodiment, the cement composition has a density of at least 10 pounds per gallon (ppg) (1.2 kilograms per liter (kg/l)). In another embodiment, the cement composition has a density of at least 15 ppg (1.8 kg/l). In another embodiment, the cement composition has a density in the range of about 15 to about 20 ppg (about 1.8 to about 2.4 kg/l).

According to another embodiment, a method of cementing in a subterranean formation comprises: introducing a cement composition into the subterranean formation, wherein the cement composition comprises: (A) cement; (B) water; and (C) the surfactant; and allowing the cement composition to set.

The method embodiments include the step of introducing the cement composition into a subterranean formation. The step of introducing is for the purpose of at least one of the following: well completion; foam cementing; primary or secondary cementing operations; well-plugging; and gravel packing. The cement composition can be in a pumpable state before and during introduction into the subterranean formation. In one embodiment, the subterranean formation is penetrated by a well. The well can be an oil, gas, water, or injection well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

Preferably, the method further includes the step of introducing an oil-based drilling mud into the subterranean formation prior to the step of introducing the cement composition. According to this embodiment, the cement composition becomes contaminated with a hydrocarbon liquid from the oil-based drilling fluid at a concentration of about 2% to about 25% by volume of the cement composition. The method can further include the step of introducing a spacer fluid into the subterranean formation prior to the step of introducing the cement composition. The method can further include the step of introducing the spacer fluid after the step of introducing an oil-based drilling fluid into the subterranean formation.

The method embodiments also include the step of allowing the cement composition to set. The step of allowing can be after the step of introducing the cement composition into the subterranean formation. The method can include the additional steps of perforating, fracturing, or performing an acidizing treatment, after the step of allowing.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables and figures, the concentration of any ingredient in a cement composition or a drilling mud can be expressed as by weight of the cement (abbreviated as "bwc"); pounds per barrel (abbreviated as "lb/bbl"); or gallons per sack of cement (abbreviated as "gal/sk"). Stabilizer 434D™ surfactant is a non-ionic surfactant of a substituted ethoxylated phenol. Surfactant Mixtures 1 and 2 were a mixture of two different cardanol ethoxylates. Cardanol ethoxylate A (shown below) had 8 moles of ethylene oxide and cardanol ethoxylate B (shown below) had 13 moles of ethylene oxide, where m=0, 2, 4, and 6. Surfactant Mixture 1 was a mixture of 1 part cardanol ethoxylate A to 2 parts cardanol ethoxylate B, by volume. Surfactant Mixture 2 was a mixture of 2 parts cardanol ethoxylate A to 1 part cardanol ethoxylate B, by volume.

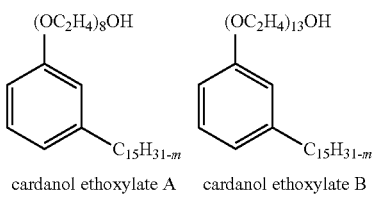

cardanol ethoxylate A    cardanol ethoxylate B

Unless otherwise stated, each of the oil-based drilling muds had a density of 13 pounds per gallon (lb/gal), had an oil water ratio of 70:30, and contained the following ingredients: 0.17 lb/bbl BAROID®-41 weighting agent; 0.51 lb/bbl of a specified hydrocarbon liquid; 0.255 lb/bbl calcium chloride; 0.003 lb/bbl ADAPTA® fluid loss agent; 0.01 lb/bbl BARA-CARB®-5 weighting agent; 0.025 lb/bbl LE SUPERMUL™ emulsifier; 0.0007 lb/bbl RHEMOD™ L rheology modifier; and 0.022 lb/bbl Rev Dust drilling solids.

Unless otherwise stated, each of the cement compositions had a density of 15.8 lb/gal and contained at least the following ingredients: 4.92 gal/sk deionized water; Class G cement; 0.05 gal/sk D-AIR 3000L™ defoaming agent; 1% bwc HALAD®-344 fluid loss additive; 0.8% bwc HALAD®-413 fluid loss additive; and 0.5% bwc SCR-100™ set retarder. Some of the cement compositions also included a surfactant.

Unless stated otherwise, all of the cement compositions were mixed and tested according to the procedure for the specific test as described in The Detailed Description section above. Rheology testing was conducted at a temperature of 190° F. (88° C.). The cement compositions were tested for initial setting time at a temperature of 220° F. (104° C.) and a pressure of 3,000 psi (7 MPa). The tests for time to reach 500 psi were conducted using the non-destructive compressive strength method at a temperature of 220° F. (104° C.) and a pressure of 3,000 psi (21 MPa). The non-destructive compressive strength tests were conducted at 24 or 48 hours, a temperature of 220° F. (104° C.), and a pressure of 3,000 psi (21 MPa). The thickening time tests were conducted at a temperature of 185° F. (85° C.) and a pressure of 17,500 psi (121 MPa). The control base cement compositions did not include an oil-based drilling mud or a surfactant. Unless otherwise stated, the control contaminated base cement compositions included an oil-based drilling mud at a concentration of 20% by volume of the cement compositions.

Table 1 contains initial setting time, time to 500 psi, non-destructive compressive strength, and destructive compressive strength data for several cement compositions. The oil-based drilling mud was prepared with ENCORE® drilling fluid (an internal olefin) as the hydrocarbon liquid. As can be seen in Table 1, the control contaminated base cement had a much lower non-destructive and destructive compressive strength compared to the control base cement composition. As can also be seen in Table 1, the cement compositions containing Surfactant Mixtures 1 and 2 exhibited shorter initial setting time and time to 500 psi, and also exhibited higher non-destructive compressive strengths compared to the control contaminated base cement composition and the cement composition containing Stabilizer 434D™. The data in Table 1 shows that cardanol ethoxylate performs better than Stabilizer 434D™ (which is a substituted ethoxylated phenol).

TABLE 1

| Type of Surfactant | Conc. of Surfactant (% bwc) | Mud Contamination (% by Vol) | Initial Set Time (hr:min) | Time to 500 psi (hr:min) | Non-Destructive Comp. Strength 24 hr (psi) | Non-Destructive Comp. Strength 48 hr (psi) | Destructive Comp. Strength (psi) |
|---|---|---|---|---|---|---|---|
| Ctl. Base Cement | 0 | 0 | 10:22 | 11:00 | 2350 | 2574 | 5180 |
| Ctl. Contaminated Base Cement | 0 | 20 | 10:05 | 14:06 | 769 | 835 | 1101 |
| Stabilizer 434D ™ | 2 | 20 | 9:07 | 11:44 | 1004 | 1168 | — |
| Stabilizer 434D ™ | 0.9 | 20 | 10:01 | 22:16 | 531.6 | — | — |
| Surfactant Mixture 1 | 0.9 | 20 | 8:11 | 10:34 | 1143.7 | — | — |
| Surfactant Mixture 2 | 0.9 | 20 | 8:34 | 10:38 | 1194 | — | — |

Table 2 contains rheology, initial setting time, time to 500 psi, and non-destructive compressive strength data for several cement compositions. The oil-based drilling mud was prepared with ENCORE® drilling fluid (an internal olefin) as the hydrocarbon liquid. As can be seen in Table 2, the three cement compositions containing a surfactant exhibited better rheologies and comparable initial setting time compared to both, the control base cement composition and the control contaminated base cement composition. As can also be seen in Table 2, the cement compositions containing Surfactant Mixtures 1 and 2 exhibited comparable time to 500 psi compared to the control base cement composition, and higher non-destructive compressive strength compared to the control contaminated base cement composition and the cement composition containing Stabilizer 434D™.

TABLE 2

| Type of Surfactant | Conc. of Surf. (% bwc) | Rheology | | | | | | | | Initial Set Time (hr:min) | Time to 500 psi (hr:min) | Non-D Comp. Str. 24 hr (psi) |
|---|---|---|---|---|---|---|---|---|---|---|---|---|
| | | 3 | 6 | 30 | 60 | 100 | 200 | 300 | 600 | | | |
| Ctl. Base Cement | 0 | 11 | 19 | 67 | 111 | 160 | 265 | +300 | +300 | 10:22 | 11:00 | 2350 |
| Ctl. Contaminated Base Cement | 0 | 23 | 36 | 55 | 85 | 140 | 200 | +300 | +300 | 10:05 | 14:06 | 769 |
| Stabilizer 434D ™ | 0.9 | 4 | 7 | 25 | 45 | 68 | 105 | 145 | 234 | 10:01 | 22:16 | 531.6 |
| Surf. Mixture 1 | 0.9 | 10 | 15 | 4 | 54 | 72 | 104 | 142 | +300 | 8:11 | 10:34 | 1143.7 |
| Surf. Mixture 2 | 0.9 | 12 | 16 | 48 | 55 | 75 | 115 | 149 | +300 | 8:34 | 10:38 | 1194 |

Table 3 contains rheology, initial setting time, time to 500 psi, and non-destructive compressive strength data for several cement compositions. The oil-based drilling mud was prepared with ESCAID 110™ (a mineral oil blend of mainly alkanes and cyclic alkanes) as the hydrocarbon liquid. As can be seen in Table 3, the two cement compositions containing a surfactant exhibited better rheologies and shorter initial setting time compared to both, the control base cement composition and the control contaminated base cement composition. As can also be seen in Table 3, the cement composition containing Surfactant Mixture 1 exhibited a higher non-destructive compressive strength compared to the control contaminated base cement composition and the cement composition containing Stabilizer 434D™.

TABLE 3

| Type of Surfactant | Conc. of Surf. (% bwc) | Rheology | | | | | | | | Initial Set Time (hr:min) | Time to 500 psi (hr:min) | Non-D Comp. Str. 24 hr (psi) |
|---|---|---|---|---|---|---|---|---|---|---|---|---|
| | | 3 | 6 | 30 | 60 | 100 | 200 | 300 | 600 | | | |
| Ctl. Base Cement | 0 | 11 | 19 | 67 | 111 | 160 | 265 | +300 | +300 | 10:22 | 11:00 | 2350 |
| Ctl. Contaminated Base Cement | 0 | 15 | 28 | 75 | 108 | 141 | 211 | 270 | +300 | 11:10 | 16:12 | 742.2 |
| Stabilizer 434D ™ | 0.9 | 2 | 3 | 7 | 12 | 19 | 52 | 96 | 191 | 8:25 | — | 316.5 |
| Surf. Mixture 1 | 0.9 | 6 | 10 | 29 | 45 | 62 | 102 | 138 | 248 | 9:29 | 12:27 | 1017.8 |

Table 4 contains rheology, initial setting time, time to 500 psi, and non-destructive compressive strength data for several cement compositions. The oil-based drilling mud was prepared with PETROFREE® ESTER base fluid (a fatty acid ester) as the hydrocarbon liquid. As can be seen in Table 4, the two cement compositions containing a surfactant exhibited better rheologies and comparable initial setting time compared to both, the control base cement composition and the control contaminated base cement composition. As can also be seen in Table 4, the cement composition containing Surfactant Mixture 1 exhibited a higher non-destructive compressive strength compared to the control contaminated base cement composition and the cement composition containing Stabilizer 434D™.

TABLE 4

| Type of Surfactant | Conc. of Surf. (% bwc) | Rheology | | | | | | | | Initial Set Time (hr:min) | Time to 500 psi (hr:min) | Non-D Comp. Str. 24 hr (psi) |
|---|---|---|---|---|---|---|---|---|---|---|---|---|
| | | 3 | 6 | 30 | 60 | 100 | 200 | 300 | 600 | | | |
| Ctl. Base Cement | 0 | 11 | 19 | 67 | 111 | 160 | 265 | +300 | +300 | 10:22 | 11:00 | 2350 |
| Ctl. Contaminated Base Cement | 0 | 20 | 34 | 89 | 128 | 165 | 234 | +300 | +300 | 9:36 | — | 351.2 |

TABLE 4-continued

| Type of Surfactant | Conc. of Surf. (% bwc) | Rheology | | | | | | | | Initial Set Time (hr:min) | Time to 500 psi (hr:min) | Non-D Comp. Str. 24 hr (psi) |
|---|---|---|---|---|---|---|---|---|---|---|---|---|
| | | 3 | 6 | 30 | 60 | 100 | 200 | 300 | 600 | | | |
| Stabilizer 434D ™ | 0.9 | 15 | 20 | 43 | 50 | 70 | 95 | 114 | 184 | 9:40 | — | 207.5 |
| Surf. Mixture 1 | 0.9 | 8 | 11 | 24 | 38 | 50 | 78 | 105 | 248 | 9:54 | — | 419.4 |

Table 5 contains rheology, initial setting time, time to 500 psi, and non-destructive compressive strength data for several cement compositions. The oil-based drilling mud was prepared with XP-07™ base fluid (a synthetic paraffin) as the hydrocarbon liquid. As can be seen in Table 5, the two cement compositions containing a surfactant exhibited better rheologies and comparable initial setting time compared to both, the control base cement composition and the control contaminated base cement composition. As can also be seen in Table 5, the cement composition containing Surfactant Mixture 1 exhibited a shorter time to 500 psi and a higher non-destructive compressive strength compared to the control contaminated base cement composition.

TABLE 5

| Type of Surfactant | Conc. of Surf. (% bwc) | Rheology | | | | | | | | Initial Set Time (hr:min) | Time to 500 psi (hr:min) | Non-D Comp. Str. 24 hr (psi) |
|---|---|---|---|---|---|---|---|---|---|---|---|---|
| | | 3 | 6 | 30 | 60 | 100 | 200 | 300 | 600 | | | |
| Ctl. Base Cement | 0 | 11 | 19 | 67 | 111 | 160 | 265 | +300 | +300 | 10:22 | 11:00 | 2350 |
| Ctl. Contaminated Base Cement | 0 | 12 | 16 | 45 | 80 | 111 | 165 | 240 | +300 | 11:37 | 20:04 | 581.7 |
| Stabilizer 434D ™ | 0.9 | 8 | 11 | 25 | 30 | 36 | 53 | 74 | 132 | 9:38 | 16:36 | 677.7 |
| Surf. Mixture 1 | 0.9 | 10 | 15 | 20 | 32 | 40 | 70 | 95 | 195 | 11:33 | 17:46 | 648.3 |

The tests for the data listed in Table 6 were conducted to evaluate the effectiveness of Surfactant Mixture 1 with varying degrees of mud contamination. The cement compositions contained varying amounts of an oil-based drilling mud containing ESCAID 110™ as the hydrocarbon liquid and contained varying amounts of Surfactant Mixture 1. Table 6 contains rheology, initial setting time, time to 500 psi, and non-destructive compressive strength data for several cement compositions. As can be seen in Table 6, for a given concentration of mud contamination, the cement compositions containing Surfactant Mixture 1 exhibited better or comparable rheologies, shorter or comparable initial setting time and time to 500 psi, and higher non-destructive compressive strength, compared to the cement compositions that did not include Surfactant Mixture 1. As can also be seen in Table 6, Surfactant Mixture 1 increased the compressive strength of a contaminated cement composition compared to a contaminated cement composition without the surfactant. As a result, it appears that Surfactant Mixture 1 has applications in a wide variety of wells with varying degrees of oil-based mud contamination.

TABLE 6

| Conc. of Mud (% by Vol) | Conc. of Surf. (% bwc) | Rheology | | | | | | | | Initial Set Time (hr:min) | Time to 500 psi (hr:min) | Non-D Comp. Str. 24 hr (psi) |
|---|---|---|---|---|---|---|---|---|---|---|---|---|
| | | 3 | 6 | 30 | 60 | 100 | 200 | 300 | 600 | | | |
| 0 | 0 | 11 | 19 | 67 | 111 | 160 | 265 | +300 | +300 | 10:22 | 11:00 | 2350 |
| 15 | 0 | 8 | 12 | 27 | 49 | 74 | 147 | 210 | +300 | 9:47 | 15:46 | 735.6 |
| | 0.9 | 9 | 13 | 41 | 63 | 92 | 153 | 210 | +300 | 9:49 | 12:17 | 1000.7 |

TABLE 6-continued

| Conc. of Mud (% by Vol) | Conc. of Surf. (% bwc) | Rheology | | | | | | | | Initial Set Time (hr:min) | Time to 500 psi (hr:min) | Non-D Comp. Str. 24 hr (psi) |
|---|---|---|---|---|---|---|---|---|---|---|---|---|
| | | 3 | 6 | 30 | 60 | 100 | 200 | 300 | 600 | | | |
| 20 | 0 | 15 | 25 | 75 | 108 | 141 | 211 | 270 | +300 | 11:10 | 16:12 | 742.2 |
| | 0.9 | 6 | 10 | 29 | 45 | 62 | 102 | 138 | 248 | 9:29 | 12:27 | 1017.8 |
| 25 | 0 | 15 | 26 | 73 | 112 | 153 | 243 | +300 | +300 | 9:41 | — | 403.8 |
| | 0.9 | 16 | 28 | 84 | 120 | 182 | 276 | +300 | +300 | 10:22 | 15:41 | 706.4 |

As can be seen in Tables 1-6, Surfactant Mixtures 1 and 2, and Stabilizer 434D™ are suitable for use with a variety of oil-based drilling muds. When the hydrocarbon liquid for the oil-based drilling mud was an internal olefin or a mineral oil blend of mainly alkanes and cyclic alkanes, Surfactant Mixture 1 provided a much greater increase in the compressive strength of the cement composition compared to the control contaminated cement compositions. When the hydrocarbon liquid for the oil-based drilling fluid was a fatty acid ester or a paraffin, Surfactant Mixture 1 provided a smaller increase in the compressive strength of the cement composition compared to the control contaminated cement compositions.

Table 7 contains thickening time data and time to reach 100 Bc data for three different cement compositions. The oil-based drilling mud was prepared with ENCORE® drilling fluid as the hydrocarbon liquid. As can be seen in Table 7, the cement composition containing the surfactant exhibited a comparable thickening time and time to reach 100 Bc compared to the control contaminated cement composition, and exhibited a slightly shorter thickening time and time to reach 100 Bc compared to the control base cement composition.

TABLE 7

| Type of Surfactant | Conc. of Surfactant (% bwc) | Thickening Time (hr:min) | Time to Reach 100 Bc (hr:min) |
|---|---|---|---|
| Ctl. Base Cement | 0 | 7:06 | 7:11 |
| Ctl. Contaminated Base Cement | 0 | 6:27 | 6:27 |
| Surfactant Mixture 1 | 0.9 | 6:23 | 6:32 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A well treatment composition comprising:
   cement;
   water; and
   a surfactant comprising:
      a substituted ethoxylated phenol and derivatives thereof, having at least one substituent, wherein the substituted ethoxylated phenol and derivatives thereof comprises at least one of the following chemical structures:

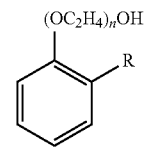

I

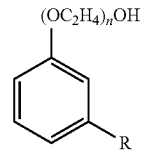

II

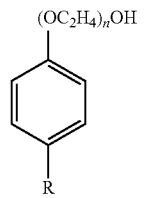

III

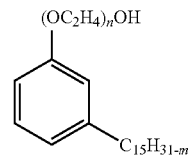

IV where n=1-14, R=an alkyl, alkene, or alkyne with a carbon chain length in the range of 4 to 25, and where m=0, 2, 4, and 6; wherein the substituted ethoxylated phenol and derivatives thereof, is a substituted cardanol ethoxylate and wherein the substituted cardanol ethoxylate and derivatives thereof has at least one of the following chemical structures:

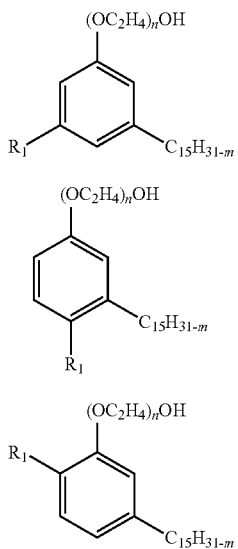

where n=1-14; m=0, 2, 4, and 6; and $R_1$=an alkyl, alkene, or alkyne with a carbon chain length in the range of 4 to 25.

2. The composition according to claim 1, wherein the cement is selected from the group consisting of Class A cement, Class C cement, Class G cement, Class H cement, and any combination thereof.

3. The composition according to claim 1, wherein the water is selected from the group consisting of freshwater, brackish water, saltwater, and any combination thereof.

4. The composition according to claim 1, wherein the surfactant is non-ionic.

5. The composition according to claim 1, wherein the surfactant comprises a para-substituted ethoxylated phenol derivative in which R=an alkyl with a carbon chain length of 9.

6. The composition according to claim 1, wherein n=6-13.

7. The composition according to claim 1, wherein the surfactant is biodegradable.

8. The composition according to claim 1, wherein the surfactant is in a concentration in the range of about 0.05% to about 5% by weight of the cement.

9. The composition according to claim 1, wherein the composition has a thickening time in the range of about 4 to about 15 hours at a temperature of 185° F. (88° C.) and a pressure of 17,500 psi (121 MPa).

10. The composition according to claim 1, wherein the composition has an initial setting time of less than 24 hours at a temperature of 220° F. (104° C.) and a pressure of 3,000 psi (21 MPa).

11. The composition according to claim 1, wherein the composition has a setting time of less than 48 hours at a temperature of 220° F. (104° C.).

12. The composition according to claim 1, wherein the composition has a non-destructive compressive strength in the range of about 500 to about 10,000 psi (about 3.5 to about 69 MPa) when tested at 24 hours, a temperature of 220° F. (104° C.), and a pressure of 3,000 psi (21 MPa).

13. The composition according to claim 1, wherein the composition has an initial setting time of less than 24 hours at the bottomhole temperature and pressure of a subterranean formation.

14. The composition according to claim 1, wherein the composition has a setting time of less than 48 hours at the bottomhole temperature and pressure of a subterranean formation.

15. The composition according to claim 1, wherein the composition has a non-destructive compressive strength in the range of about 500 to about 10,000 psi (about 3.5 to about 69 MPa) the bottomhole temperature and pressure of a subterranean formation.

16. The composition according to claim 1, wherein the composition further includes an additive.

17. The composition according to claim 15, wherein the additive is selected from the group consisting of a filler, a fluid loss additive, a set retarder, a friction reducer, a strength-retrogression additive, a defoaming agent, a high-density additive, a set accelerator, a mechanical property enhancing additive, a lost-circulation material, a filtration-control additive, a thixotropic additive, a nano-particle, and combinations thereof.

18. The composition according to claim 1, wherein the composition has a density in the range of about 15 to about 20 ppg (about 1.8 to about 2.4 kg/l).

19. The composition according to claim 17, wherein the composition becomes contaminated with a hydrocarbon liquid from an oil-based drilling fluid at a concentration of about 2% to about 25% by volume of the composition.

* * * * *

UNITED STATES PATENT AND TRADEMARK OFFICE
CERTIFICATE OF CORRECTION

PATENT NO. : 8,459,356 B2
APPLICATION NO. : 13/713890
DATED : June 11, 2013
INVENTOR(S) : Abhijit Tarafdar et al.

It is certified that error appears in the above-identified patent and that said Letters Patent is hereby corrected as shown below:

In the Claims

Please change the dependency for the following two claims:

Column 20, line 30 – Claim 17 – The composition according to claim [[15]] 16,
Column 20, line 41 – Claim 19 – The composition according to claim [[17]] 18, Signed and Sealed this
Twenty-sixth Day of November, 2013

Margaret A. Focarino
*Commissioner for Patents of the United States Patent and Trademark Office*